| United States Patent [19] | [11] 4,018,615 |
| Mills | [45] Apr. 19, 1977 |

[54] REFRACTORY MATERIAL CONTAINING FUSED SILICA AND CRYSTALLINE PHASE SILICA

[75] Inventor: David Mills, Bristol, England

[73] Assignee: Rolls-Royce (1971) Limited, England

[22] Filed: Nov. 3, 1975

[21] Appl. No.: 628,404

[30] Foreign Application Priority Data

Nov. 20, 1974 United Kingdom ............ 50216/74

[52] U.S. Cl. ................................................. 106/69
[51] Int. Cl.² ........................................ C04B 35/14
[58] Field of Search ...................................... 106/69

[56] References Cited

UNITED STATES PATENTS

| 3,463,650 | 8/1969 | McCreight et al. .................. 106/69 |
| 3,684,538 | 8/1972 | Wright ................................ 106/69 |

Primary Examiner—J. Poer
Attorney, Agent, or Firm—Stevens, Davis, Miller & Mosher

[57] ABSTRACT

The high temperature dimensional stability and resistance to thermal shock of silica articles is improved by ensuring that from 45-60% by weight of the article consists of crystalline phase silica. Such levels of crystalline phase silica may be attained by intimately mixing finely divided particles of fused silica and crystalline phase silica, molding the mixture to the required shape and then heating the molded mixture at a temperature sufficiently high enough to sinter the particles, but not high enough to cause rapid crystallization of the fused silica.

7 Claims, No Drawings

REFRACTORY MATERIAL CONTAINING FUSED SILICA AND CRYSTALLINE PHASE SILICA

This invention relates to refractory materials which contain fused silica and crystalline phase silica and to a method of manufacturing such materials.

Refractory materials which contain fused silica are used in the construction of articles which are required to remain dimensionally stable when subjected to high temperatures. Mold cores for use in the metal casting art are an example of such articles.

One of the problems associated with the use of articles which contain fused silica to the exclusion of crystalline phase silica is their tendency to bend or bow when subjected to high temperatures. It is known however that this tendency may be reduced by ensuring that at least some of the silica contained within the article is in at least one of its crystalline phases i.e. in the form of crystobalite and/or trydimite. Care must be taken however to ensure that the crystalline phase content does not rise above a certain level, usually about 70% by weight. Above that level the resistance of the article to thermal shock is poor.

It is an object of the present invention to provide articles which contain fused silica and crystalline phase silica and which have improved resistance to bending or bowing and improved resistance to thermal shock.

Thus according to one aspect of the present invention, a refractory article comprises an intimate mixture of crystalline phase silica and fused silica, said crystalline phase silica constituting from 45 to 60% by weight of said mixture.

We have found that optimum resistance to bending or bowing and optimum resistance to thermal shock is attained when the crystalline phase silica constitutes 50% by weight of the refractory article.

Crystal phase formation in fused silica is usually induced by a heat treatment process in which the fused silica article is heated at a temperature of about 1200° C. Unfortunately, however, the rate of crystal phase formation is dependent upon very accurate temperature control; a little below 1200° C the rate is very slow but a little above 1200° C the rate is extremely rapid, often resulting in complete crystallization. It is not unusual as a result of this to find a variation of from 5 to 20% crystalline phase silica content from batch to batch of fused silica articles which have been heat treated to induce crystal formation.

The present invention further provides a method of manufacturing articles containing fused silica and crystalline phase silica in which the crystalline phase content is fixed at a substantially predetermined level.

According to a further aspect of the present invention, a method of manufacturing a refractory article comprising fused silica and crystalline phase silica comprises the subsequent steps of intimately mixing finely divided particles of fused silica and crystalline phase silica, molding the intimate mixture to the required shape and heating the molded intimate mixture at a temperature sufficiently high enough to sinter the particles of fused silica and crystalline phase silica but not high enough to cause rapid crystallisation of the fused silica.

The intimate mixture preferably contains from 45 to 60% by weight crystalline phase silica.

The intimate mixture may contain 50% by weight of crystalline phase silica.

The molded intimate mixture is preferably held at the sintering temperature for 2 to 4 hours.

The present invention therefore provides in one aspect a method of manufacturing an article containing silica, which silica may consist of fused silica and crystalline phase silica in any desired ratio. In general we have found that the greater the crystalline phase silica content is, the more resistant the silica is to bending and bowing.

As previously stated, the rapid conversion of fused silica to crystalline phase silica occurs at temperatures in excess of about 1200° C. This means that the temperature at which sintering takes place should not exceed about 1200° C. In practice, sintering is most conveniently carried out at a temperature in the range 1000°–1200° C.

It is sometimes desirable, however, to heat treat articles containing fused silica and crystalline phase silica at temperatures in excess of 1200° C in order to render them more refractory or heat resistant. Under normal circumstances, this heat treatment would result in the undesirable rapid conversion of the fused silica to crystalline phase silica. However, by including from 1 to 10% by weight of one or more oxides of the elements of Group III(b) of the Periodic Table in the intimate mixture of fused silica and crystalline phase silica, any tendency of the fused silica to convert to the crystalline phase at temperatures in excess of 1200° C is considerably reduced.

In order that the intimate mixture of finely divided particles of fused silica, crystalline phase silica and, if used, Group III(b) element oxide, may be readily molded to the required shape, we prefer to make a slurry of the mixture in a thermally decomposable resin binder. The mixture may then be molded to the required shape by any convenient method such as injection molding.

However, when a resin binder is utilised, the molded intimate mixture is preferably heated to a temperature sufficiently high enough to decompose and burn off the binder before being heated to the sintering temperature.

It is preferred that the finely divided particles of fused silica crystalline phase silica, and, if used, Group III(b) element oxide should be of a particle size within the range −100 to −200 British Standard mesh.

The following examples will serve to illustrate the present invention.

EXAMPLE 1

A mixture containing the following constituents was made up:

| | |
|---|---|
| R60906 Silicone Resin (manufactured by Dow Corning) | 110 grams |
| Aluminium Stearate (release agent) | 6 grams |
| Acetate Catalyst for Resin | 4 grams |
| −200 B.S. mesh Alumina | 18 grams |
| −100 B.S. mesh Fused Silica | 255 grams |
| −100 B.S. mesh Crystobalite | 145 grams |

The crystalline phase silica is present in an amount of 36.3% by weight based on the total silica.

The mixture, with the exception of the catalyst, was hot blended for ten minutes at 85° C. After ten minutes blending, the catalyst was added and blending continued for a further five minutes. The mixture was then cooled and granulated before being cold pressed into suitably sized pellets.

The pellets were then transfer molded at 180° C to form a rectangular test piece size 100 mm × 10 mm × 4 mm.

The test piece was slowly heated up to 400° C in air over a period of 5 hours to burn off the resin binder before being slowly heated from 400° to 600° C over a period of 15 hours and from 600° to 1100° C over a period of 20 hours.

The test piece was maintained at 1100° C for 3 hours to allow sintering to take place before being furnace cooled.

The test piece was placed on two knife edges spaced three inches apart in a furnace maintained at 1100° C. The test piece was then centrally loaded with a knife edge adapted to exert a load of 700 grams. The bending rate was then monitored.

It was found that the centre of the test piece deformed at a rate of 0.001 inch per minute with respect to the two supporting knife edges.

EXAMPLE 2

A mixture containing the following constituents was made up:

| | |
|---|---|
| R60906 Silicone Resin (manufactured by Dow Corning) | 120 grams |
| Aluminium Stearate (release agent) | 6 grams |
| Acetate Catalyst for Resin | 4 grams |
| -200 B.S. mesh Alumina | 12 grams |
| -100 B.S. mesh Fused Silica | 120 grams |
| -100 B.S. mesh Crystobalite | 280 grams |

The crystalline phase silica is present in an amount of 70% by weight based on the total silica.

The mixture was formed into pellets and transfer molded to form a 100 mm × 10 mm × 4 mm test piece as described in the previous example.

The test piece was then slowly heated up to 700° over a period of 36 hours to burn off the resin binder before being slowly heated up to a temperature of 1450° C over a period of 24 hours. The test piece was maintained at 1450° C for 4 hours before being furnace cooled.

The test piece was then placed in two knife edges and its bending rate was measured as described in the previous example. The center of the test piece was found to deform at a rate of 0.0005 inch per minute with respect to the two supporting knife edges.

I claim:

1. A method of manufacturing a refractory article comprising fused silica and crystalline phase silica comprising the steps of intimately mixing finely divided particles of fused silica and crystalline phase silica wherein said mixture contains about 36.3% to 70% by weight of crystalline phase silica based on the total silica, molding the intimate mixture to the required shape and heating the molded intimate mixture at a temperature sufficiently high enough to sinter the particles of fused silica and crystalline phase silica, but not high enough to cause rapid crystallization of the fused silica.

2. A method of manufacturing a refractory article as claimed in claim 1 wherein said intimate mixture contains from 45 to 60% by weight of crystalline phase silica.

3. A method of manufacturing a refractory article as claimed in claim 2 wherein said intimate mixture contains 50% by weight of crystalline phase silica.

4. A method of manufacturing a refractory article as claimed in claim 1 wherein said molded intimate mixture is held at the sintering temperature for 2 to 4 hours.

5. A method of manufacturing a refractory article as claimed in claim 1 wherein said molded intimate mixture is sintered at a temperature in the range 1000°–1200° C.

6. A method of manufacturing a refractory article as claimed in claim 1 wherein said intimate mixture also contains from 1 to 10% by weight of one or more oxides of the elements of Group III (b) of the Periodic Table.

7. A method of manufacturing a refractory article as claimed in claim 6 wherein said one or more oxides of the elements of Group III (b) of the Periodic Table have a particle size within the range −100 to −200 British standard mesh.

* * * * *